No. 713,572. Patented Nov. 11, 1902.
J. T. ROBIN.
MACHINE FOR PRODUCING INCANDESCENT MANTLES.
(Application filed Dec. 26, 1901.)
(No Model.) 4 Sheets—Sheet 1.
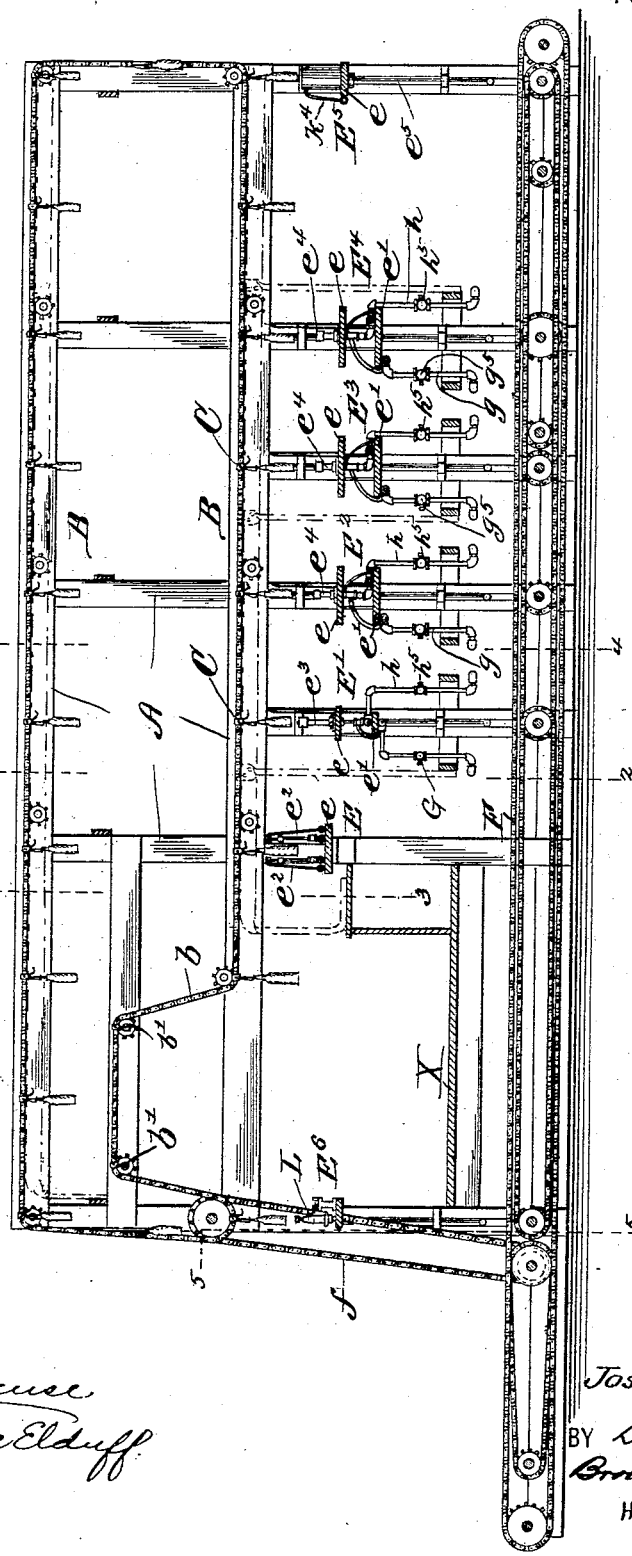
WITNESSES:
INVENTOR
Joseph T. Robin
BY Dickerson,
HIS ATTORNEYS

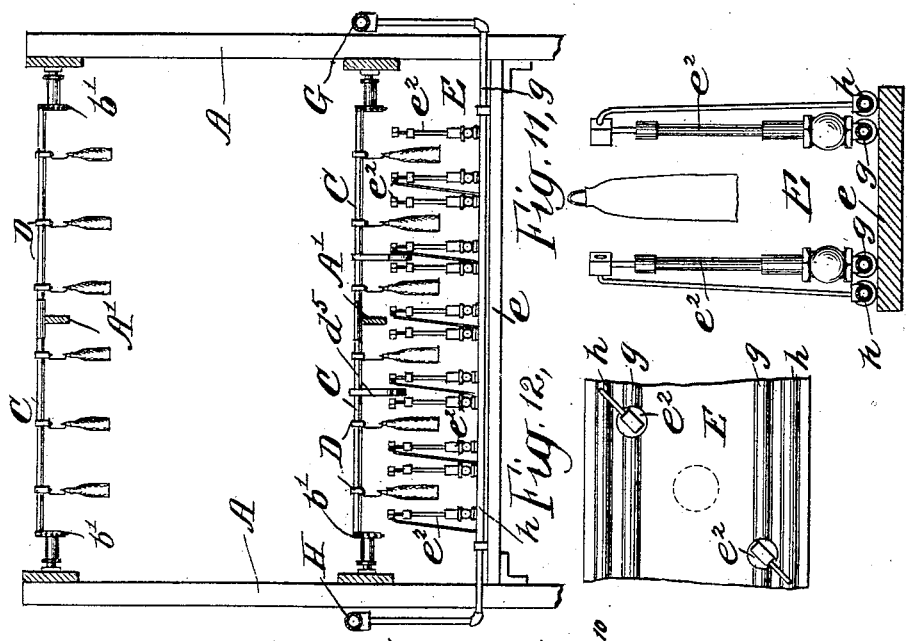
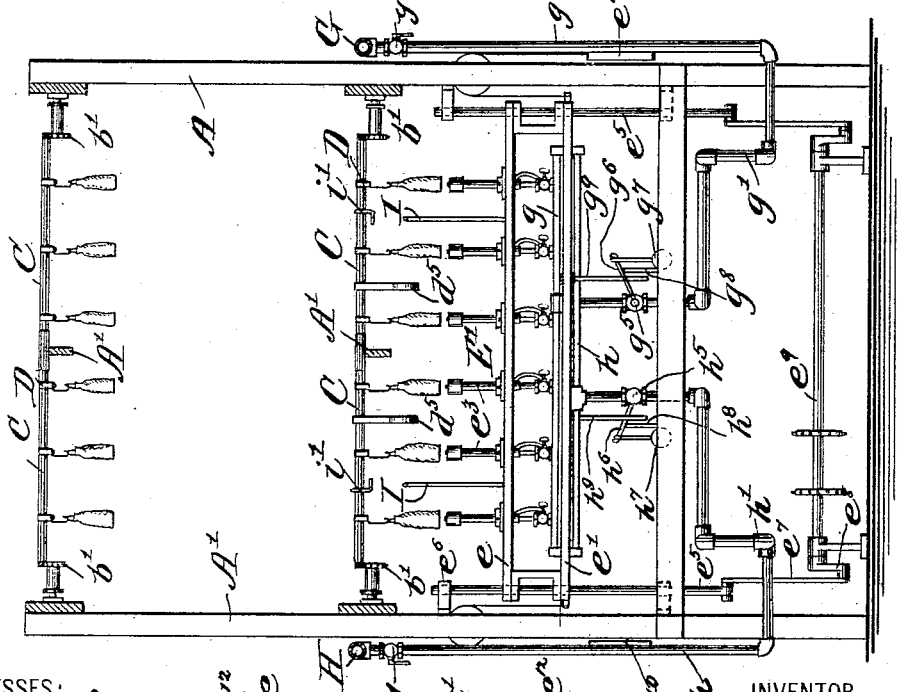

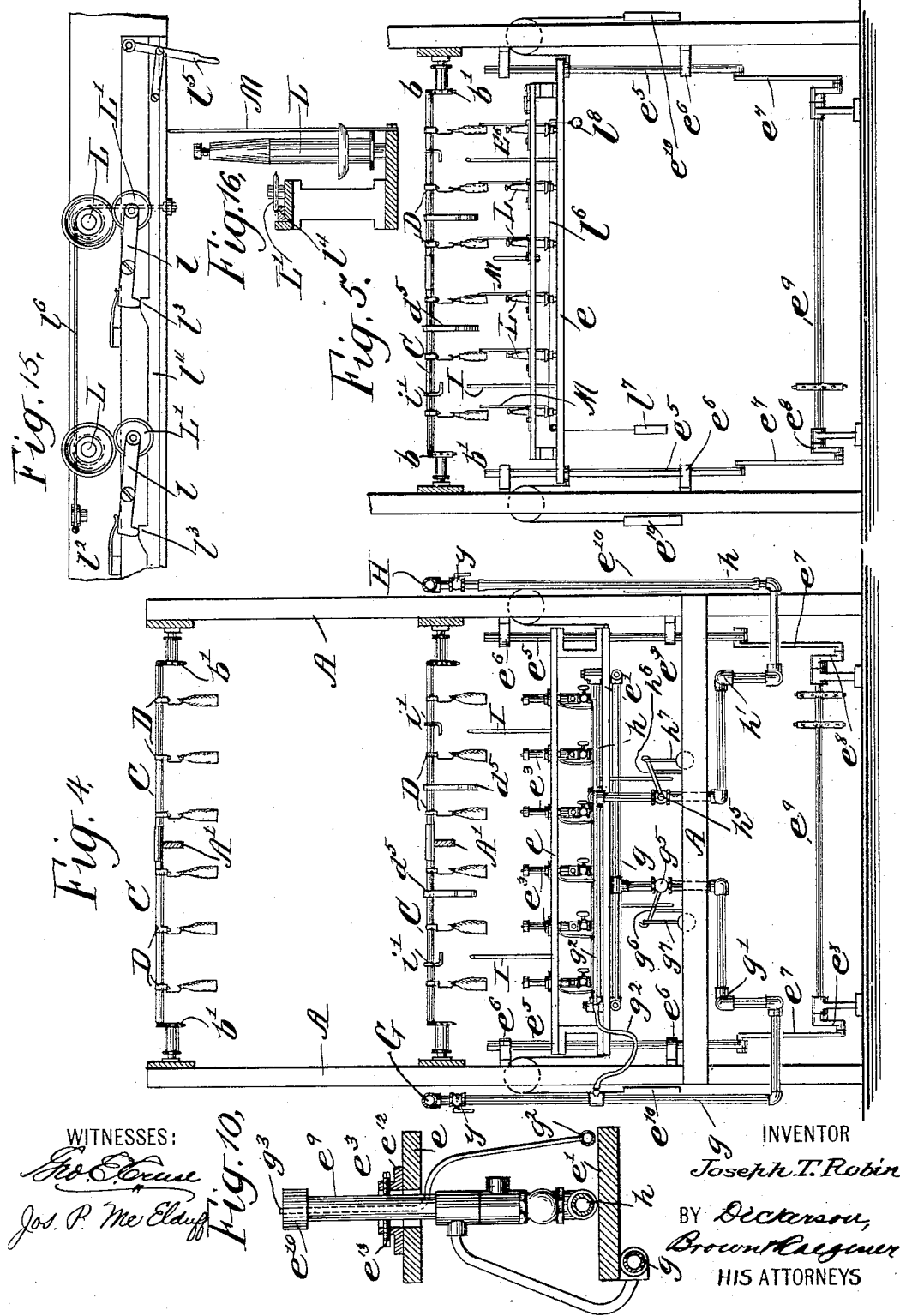

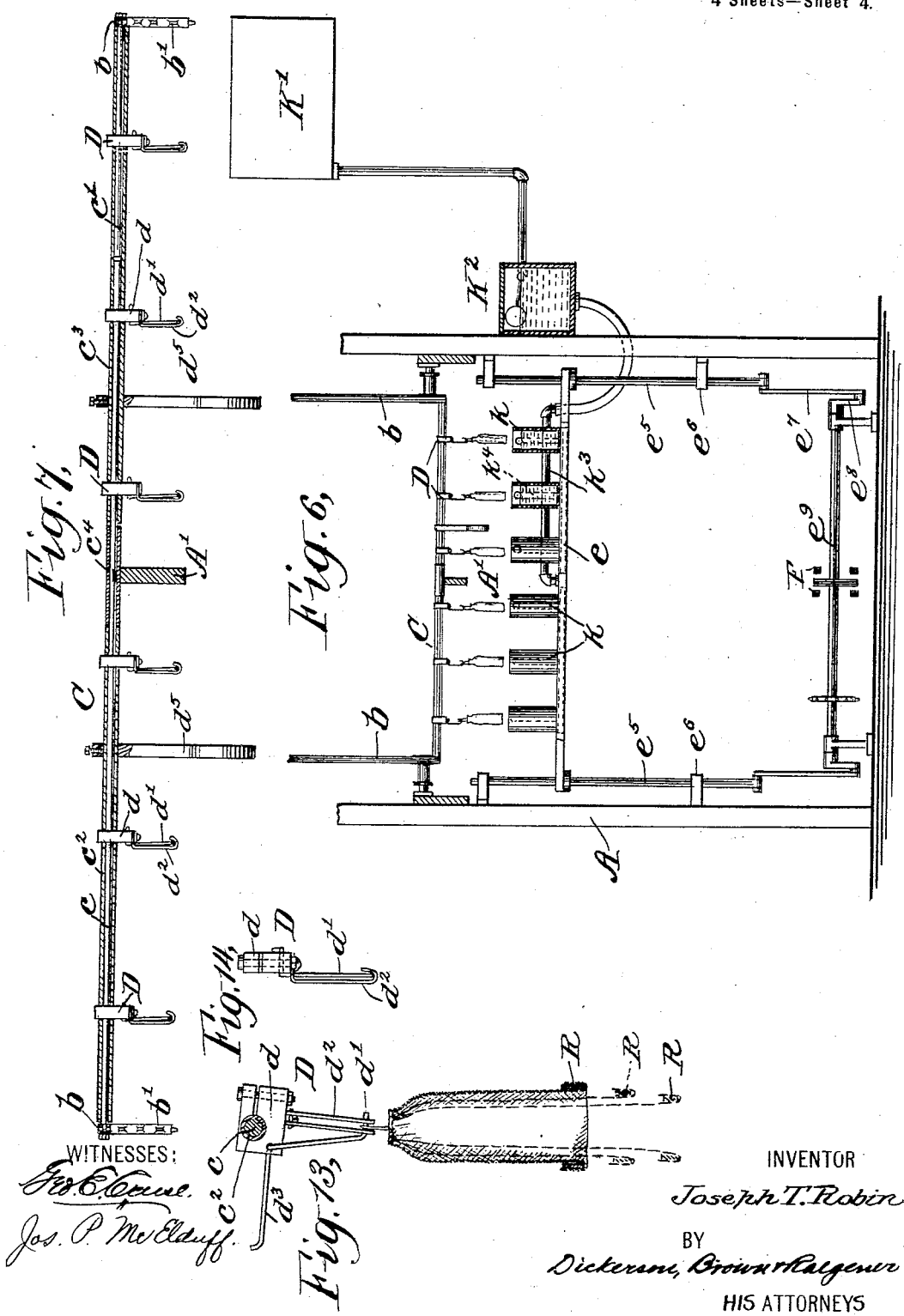

UNITED STATES PATENT OFFICE.

JOSEPH T. ROBIN, OF NEW YORK, N. Y.

MACHINE FOR PRODUCING INCANDESCENT MANTLES.

SPECIFICATION forming part of Letters Patent No. 713,572, dated November 11, 1902.

Application filed December 26, 1901. Serial No. 87,343. (No model.)

*To all whom it may concern:*

Be it known that I, JOSEPH T. ROBIN, a citizen of the United States, residing in the borough of Manhattan, city, county, and State of New York, have invented certain new and useful Improvements in Machines for Producing Incandescent Gas-Mantles, of which the following is a specification.

My invention relates to a machine for treating fabrics in the shape of stockings impregnated with a suitable substance or substances, usually rare earthy salts, to produce incandescent gas-mantles. I will describe such a machine embodying my invention and then point out the novel features thereof in the claims.

In the accompanying drawings, Figure 1 is a longitudinal sectional view of a machine for treating impregnated fabrics to produce incandescent gas-mantles embodying my invention. Fig. 2 is a vertical transverse sectional view taken in the plane indicated by the line 2 2 of Fig. 1. Fig. 3 is a detail vertical transverse sectional view taken in the plane indicated by the line 3 3 of Fig. 1. Fig. 4 is a view similar to Fig. 2, but taken in the plane indicated by the line 4 4 of Fig. 5. Fig. 5 is a view similar to Fig. 4, but taken in the plane indicated by the line 5 5 of Fig. 1. Fig. 6 is an end elevation of the machine, partly in section, at which the partially-treated stockings are dipped. Fig. 7 is a detail view, partly in section, of parts comprised in a traveling support. Fig. 8 is a detail view, partly in section, of a burner comprised in the machine. Fig. 9 is a top plan view of Fig. 8. Fig. 10 is a detail view, partly in section, of a slightly-different form of burner. Fig. 11 is a detail view of a burner comprised in the machine. Fig. 12 is a top plan view of Fig. 11. Fig. 13 is a detail view of a support and stocking carried thereby, the latter being in section to show a shaping means. Fig. 14 is a detail side elevation. Fig. 15 is a detail top plan view of a mantle-trimming device. Fig. 16 is a detail sectional view.

Similar letters of reference designate corresponding parts in all of the figures.

A represents a framework of any desired material or materials upon which the several parts comprised in the machine may be supported or suspended, it being of any desired construction and arrangement.

B represents a traveling support from which the impregnated stockings and resultant mantles are suspended. The support is here shown as consisting of a pair of endless belts $b\,b$, in the form of sprocket-chains, which pass over sprockets $b'$. The sprockets serve to guide and support the chains in their travel. Extending between the two chains $b\,b$ are a plurality of carrier-bars C, carrying suspension devices D for the impregnated stockings and resultant mantles. The carrier-bars C (see Fig. 7) are here shown as consisting of two rods $c\,c'$, two tubes $c^2\,c^3$, in which the rods are inclosed, and a short tube $c^4$, located between the tubes $c^2\,c^3$. The rods $c\,c'$ are preferably of different lengths and they are each connected at an end to a chain $b$. The other ends of the two rods are adjacent each other in one of the tubes $c^3$. The short tube $c^4$ serves as a roller and travels on a track $A'$, supported by the framework. The track $A'$ is so arranged as to have the bars horizontal. The purpose of having the carrier-bars in sections and arranged as described is to allow for contraction and expansion of the several parts. Each suspension device D consists (see Figs. 13 and 14) of a base $d$, so formed as to be capable of being adjustably secured to a carrier-bar, a hook $d'$, mounted to swing in the base, and a forked portion $d^2$, secured to the base and between the prongs of which the loop of the impregnated stocking and resultant mantle is inserted. One end of the hook $d'$ receives the loop of a stocking and its other end $d^3$ serves as a handle or means whereby the hook may be swung to have its end engage or disengage the loop. It will be seen (see Fig. 13) that the devices D are secured to the tubes which are capable of rotation independently of the rods $c\,c'$. A counterbalance $d^5$ is adjustably secured to each tube $c^2\,c^3$, and by adjusting the counterbalance on the tube the suspension device D may be made to extend at any angle. Instead the suspension devices D may be adjusted to project at any angle, and the counterbalance will hold them in their adjusted position.

E, E', $E^2$, $E^3$, $E^4$, $E^5$, and $E^6$ represent tables or supports on which the various treating devices are carried. The table E, which is preferably stationary and, as here shown, comprises a single shelf $e$, carries oppositely-arranged burners $e^2$, (see Figs. 11 and 12,) arranged to produce a flame similar to that produced by blowpipes. These burners $e^2$ are for burning out the fabric comprised in the impregnated stocking to leave a structure or network of the salt or salts with which the fabric is impregnated. The table E' is here shown as comprising two shelves $e\ e'$, superimposed, and carries burners $e^3$, (see Fig. 10,) similar to the well-known Bunsen type with the exception that the flame is under pressure. These burners tend through the pressure of the flame to shape the said structures. The tables $E^2$, $E^3$, and $E^4$ are similar in construction to the table E' and carry burners $e^4$, (see Figs. 8 and 9,) similar to the burners $e^3$, and they are for hardening the structures. The table $E^5$ is here shown as comprising a single shelf $e$ and carries tanks, each containing a stiffening solution in which the hardened structures are dipped. The dipping of the hardened structures completes the treating operation of the impregnated fabric to produce a mantle. The table $E^6$ comprises a single shelf $e$ and carries a mechanism for trimming the stiffened structures. The tables E' to $E^6$, inclusive, are preferably movable in a vertical direction—that is, they are moved to and from the structures carried by the traveling support. To the shelf or shelves in each table is connected at each end thereof a rod $e^5$, working in guides $e^6$, and the lower ends of the rods are connected by a link $e^7$ with a crank $e^8$, carried on a shaft $e^9$. Instead of cranks $e^8$ eccentrics may be used. By rotating the several shafts $e^9$ the rods will be moved vertically, and hence the tables will be moved up and down in a vertical direction. To assist in moving the tables, counterbalances $e^{10}$ may be connected with the tables. The tables E' to $E^6$ may be moved vertically simultaneously, separately, in pairs, or in any desired way. Preferably the tables $E^2$, $E^3$, and $E^4$ will be raised simultaneously, and the tables $E^5$ and $E^6$ will also be raised simultaneously.

The traveling support B is preferably moved intermittently in order that the several carrier-bars, with their impregnated stockings, may be successively presented to the treating devices and be held at each treating device for a short while in order that the treating device may perform its function.

The mechanism for intermittently moving the traveling support and for raising and lowering the tables E' to $E^6$ may conveniently consist of chains F.

$f$ represents the chain which operates the traveling support.

Air and gas for the several burners are supplied through mains G and H, the former being for gas and the latter for air. The air is under pressure, but instead compressed gas may be used. The two mains G and H are here shown as being on opposite sides of the framework A. They may, however, be located on the same side of the framework. Each main may be supplied with a suitable valve. Extending along each table E to $E^4$, both inclusive, is a gas branch $g$ and an air branch $h$. These branches may have any desired arrangement on the tables. Those branches which are arranged along the movable tables have a flexible portion $g'\ h'$ of any desired form or arrangement, here shown as consisting of turn-couplings. A number of such couplings are preferably employed in each branch. This is done so as not to interfere with the movements of the table. Also extending along each table E', $E^2$, $E^3$, and $E^4$ is a secondary gas branch $g^2$, which is connected with a pilot $g^3$ in each burner. With a pilot for each of the burners provided on the tables E', $E^2$, $E^3$, and $E^4$ the air and gas supplies may be entirely shut off, and this is preferably done automatically. Both supplies may also be automatically opened, as will be hereinafter explained. In addition to the automatic cut-off for each supply a valve $y$ may be provided in each branch.

The burners $e^2$ are arranged as shown in Figs. 11 and 12, and the impregnated stocking passes between each pair of burners in the manner indicated in the dotted lines, Fig. 12, the arrow indicating the direction of travel. The burners $e^2$ are of such height as to start the burning of the fabric at the top of the impregnated stocking. The object in using two flames to destroy the fabric is, first, to ignite the fabric from both sides at the same time, which is desirable in producing a uniform result, and, second, in arranging the two flames slightly above the impregnated fabric and toward each other, so that the two flames will impinge. A spreading soft flame will be directed downward to ignite the fabric at all points at its top, thus obviating a blowing action on the fabric at its top, which would distort the shape of the resultant structure. The flames in the burners preferably burn continuously during the operation of the machine.

The burners $e^3$, carried by the table E', (see Fig. 10,) are supported directly upon the air branch $h$. Each burner $e^3$ consists of a cylinder $e^9$, in which the air and gas is mixed, and a cap $e^{10}$, at which point the flame burns. Any other form of burner may be used. The burner has its main support on the lower shelf $e'$ and extends through an opening in the upper shelf $e$. The burners are centered by a ring $e^{12}$, secured to the shelf $e$ and carrying four adjusting-screws $e^{13}$, arranged as shown in Fig. 9.

The burners $e^4$ are preferably of the same construction as the burners $e^3$, with the exception that they are supported on the gas branch $g$. One of these burners is shown in detail in Figs. 8 and 9.

The automatic cut-off for the air and gas supplies for the burners carried by the tables E', $E^2$, $E^3$, and $E^4$ is here shown as consisting of a valve, which is opened when the table rises and closed when the table is lowered. $g^5$ represents the valve in the gas-supply and $h^5$ the valve in the air-supply. The stem of each valve is respectively provided with an arm $g^6\,h^6$ and weights $g^7\,h^7$. The weights act to move the valves to their open position. Rests $g^8\,h^8$ are provided to limit the opening movement of the valves. Hooks or other projections $g^9\,h^9$ engage with the arms $g^6\,h^6$ to move them to close the valves.

I represents centering devices carried by the tables E', $E^2$, $E^3$, $E^4$, and $E^6$. When these tables rise, the centering devices engage projections $i'$, provided on the carrier-bars. These serve to bring the structures carried by the carrier-bars into such position that the mechanism carried by these tables may enter the lower ends of the structures. The centering devices I, carried by the table $E^6$, may be double.

The table $E^5$ is provided with a number of tanks $k$, in which a stiffening solution for the structures is contained. These tanks $k$ are supplied with the stiffening solution from a main reservoir K' through a secondary reservoir $K^2$. A pipe or conduit $k^3$, having a flexible connection with the reservoir $K^2$, is arranged along the shelf $e$, and extending from the pipe $k^3$ to the upper end of each tank is a branch $k^4$. The secondary reservoir $K^2$ contains a ball-valve, and the reservoir is supported on the framework in such position as to have the level of its contents the same as the level of the contents in each of the tanks $k$ when the table $E^6$ is in its lowest position. When the liquid in the reservoir $K^2$ falls below the normal level, the float-valve opens to permit solution from the main reservoir K' to flow into it.

The table $E^6$ carries a mechanism for trimming the stiffened structures, and it is here shown as consisting of a plurality of mandrels L, with each of which a knife L' coacts. The knives L', which are here shown as being in the form of disks, are each carried in one end of a lever $l$, the other end $l'$ of which is acted upon a spring $l^2$, which tends to force its knife toward the mandrel with which its knife coacts. The ends $l'$ of the levers $l$ are also acted upon by cams $l^3$, which are carried by a bar $l^4$. The bar $l^4$ is reciprocated longitudinally by a hand-lever $l^5$, and when moved in one direction the cams $l^3$ carried thereby permit the springs $l^2$ to move the knives into engagement with the mandrels. A cord $l^6$, which is given a few turns about each mandrel, is employed to rotate the mandrels after the knives are moved into engagement with the mandrels. A weight $l^7$ is provided at one end of the cord $l^6$ and a finger-piece $l^8$ is provided at the other. The weight is for causing a rotation of the mandrels in a reverse direction. I do not make any claim herein for the trimming mechanism *per se*, as the same forms the subject-matter of another application filed by me.

When the table $E^6$ is moved upward, vertical bars or uprights M carried thereby engage with the hooks $d'$ of the suspension devices D to cause the hooks to move on their pivots and permit the stiffened structures to drop into the mandrels.

Referring now to Fig. 13, the impregnated stockings are each provided with a shaper R, here shown as being in the form of an annular weight, which is placed in a fold at the lower end of the stocking and is adapted to prevent irregularities appearing in the structure during the burning of the fabric and during the subsequent treatments of the structure. The material of the shaper is preferably incombustible and may be either asbestos or a metal having high heat-resisting properties, or it may be a combination of asbestos and some metal which is inclosed by the asbestos. It is also preferably split and flexible in order that various diameters may be had from a single shaper. Shapers of different weights may also be employed. By using shapers of different weights the shape and diameter of the structures produced from the impregnated stocking may be varied, as shown by dotted lines in Fig. 13. Thus a shaper of heavy weight will cause an elongation of the structure and a consequent decrease in the diameter of the structure. Lesser weights of shapers will cause less elongation of the structure. The shaper also acts to hold the end of the structure open, and thus permit the necessary heating devices to easily enter the structure and also to prevent irregularities in the wall of the structure when being treated by the successive burners. The shapers are applied to the stockings before or at the time the stockings are placed upon the carriers and before being treated by the burners $e^2$. The shapers preferably retain their connection with the stockings and resultant structures until they have been acted upon by all of the treating devices. Advantageous results may also be obtained by merely providing a fold at the bottom of the stocking. The double thickness at this point stiffens the structure or network of salts and holds that end of the structure open to allow the treating devices to enter the structure.

The operation of the machine will be readily understood. The impregnated stockings are put on the suspension devices D by an attendant, who may be seated upon a platform X. The stockings first pass between the burners $e^2$, which destroy the fabric of the stocking, the burning being started at the top of the stocking. After the fabric has been completely burned out the resultant structures, which then consist of a structure or network of the salt or salts with which the stockings were impregnated, are moved to the burners $e^3$, through which a blast of air and gas passes for shaping the structures. This operation is assisted in by the shapers R, carried by the structures. After leaving the shaping-burners the structures are subjected to the successive action of the three sets of burners $e^4$. These burners act to harden the salts, which oxidize after being subjected to the action of the burners $e^2$. The structures then pass to the table $E^5$ to be dipped. They are then moved to the trimming mechanism carried by the table E along the top of the framework, where they dry.

I do not herein claim anything shown and described in my copending application, Serial No. 72,994, filed August 23, 1901.

What I claim as my invention is—

1. In a machine for treating a structure to produce an incandescent gas-mantle, the combination of a shaper for engaging the lower end of said structure, and a treating device.

2. In a machine for treating a structure to produce an incandescent gas-mantle originally consisting of a tubular fabric impregnated with a substance, the combination of a shaper for engaging the lower end of said structure and a treating device.

3. In a machine for treating a structure to produce an incandescent gas-mantle originally consisting of a tubular fabric impregnated with a substance, an annular shaper adapted to engage an upturned portion at the lower edge of the structure and a treating device.

4. In a machine for treating structures originally consisting of impregnated stockings to produce incandescent gas-mantles, the combination of a traveling support for the structures, treating devices for operating on said structures, tables for carrying the treating devices, comprising two shelves which are superimposed, burners supported on the lower shelf and projecting through the upper shelf, and means carried by each table for centering the burners relatively to the structures supported above them.

5. In a machine for treating structures originally consisting of impregnated stockings to produce incandescent gas-mantles, the combination of a traveling support for the structures, treating devices for operating on said structures, tables for carrying the treating devices, a plurality of superimposed shelves comprised in said tables, burners supported on the lower shelf and projecting through the upper shelf of the tables comprising the plurality of shelves, and means carried by each table for centering the burners relatively to the structures supported above them, said means comprising a ring and oppositely-arranged pins working in said ring.

6. In a machine for treating structures originally consisting of impregnated stockings to form incandescent gas-mantles, the combination of a series of treating devices, and a traveling support for the structures, said support consisting of a plurality of endless belts, carriers arranged between the belts and each carrier comprising a plurality of rods and a plurality of tubes inclosing the rods, and suspension devices secured to said plurality of tubes.

7. In a machine for treating structures originally consisting of impregnated stockings to produce incandescent gas-mantles, the combination of a series of treating devices, a traveling support for the structures, said support consisting of a plurality of endless belts, carriers between the belts and suspension devices secured to the carriers, and a counterbalance secured to the carriers.

8. In a machine for treating structures originally consisting of impregnated stockings to form incandescent gas-mantles, the combination of a series of treating devices for the structures, a traveling support for the structures, said traveling support comprising a plurality of endless belts, carriers extending between the belts comprising a plurality of tubes, and suspension devices for the structures carried by the tubes.

9. In a machine for treating structures originally consisting of impregnated fabrics to produce incandescent gas-mantles, the combination of a traveling support and a series of treating devices for the structures, said devices comprising a vertically-movable table, tanks containing a stiffening solution carried by said table, a main reservoir, and a secondary reservoir containing a float-valve and having connection with the tanks at their upper ends.

10. In a machine for treating structures originally consisting of impregnated fabrics to produce incandescent gas-mantles, the combination of a traveling support, and a series of treating devices for the structures, said devices consisting of a vertically-movable table, tanks containing a stiffening solution carried by the table, a secondary reservoir having connection with the tanks at their upper ends and said reservoir containing a float-valve and arranged to have its liquid-level the same as the liquid-levels of the tanks, and a main reservoir connected with the secondary reservoir.

In testimony whereof I have signed my name to this specification in the presence of two subscribing witnesses.

JOSEPH T. ROBIN.

Witnesses:
 JOS. P. MCELDUFF,
 GEO. E. CRUSE.